United States Patent
Yoden et al.

(10) Patent No.: US 9,636,604 B2
(45) Date of Patent: May 2, 2017

(54) ION EXCHANGING APPARATUS

(75) Inventors: Mitsuru Yoden, Tokyo (JP); Mikio Sugano, Tokyo (JP); Kazuhiko Saiki, Tokyo (JP); Reo Matsutani, Tokyo (JP); Kazuhiro Nishikawa, Tokyo (JP)

(73) Assignee: ORGANO CORPORATION, Tokyo (JP)

( * ) Notice: Subject to any disclaimer, the term of this patent is extended or adjusted under 35 U.S.C. 154(b) by 419 days.

(21) Appl. No.: 14/117,011

(22) PCT Filed: May 1, 2012

(86) PCT No.: PCT/JP2012/061542
§ 371 (c)(1),
(2), (4) Date: Nov. 11, 2013

(87) PCT Pub. No.: WO2012/157448
PCT Pub. Date: Nov. 22, 2012

(65) Prior Publication Data

US 2015/0136679 A1 May 21, 2015

(30) Foreign Application Priority Data

May 17, 2011 (JP) .................... 2011-110443

(51) Int. Cl.
*B01D 15/22* (2006.01)
*C02F 1/42* (2006.01)
(Continued)

(52) U.S. Cl.
CPC ........... *B01D 15/22* (2013.01); *B01J 47/022* (2013.01); *B01J 47/04* (2013.01); *B01J 49/0004* (2013.01);
(Continued)

(58) Field of Classification Search
CPC .. B01J 47/022; B01J 49/0004; B01J 49/0082; C02F 1/42; C02F 2103/34; C02F 2303/16; B01D 24/12; B01D 29/4631
(Continued)

(56) References Cited

U.S. PATENT DOCUMENTS 1,613,746 A * 1/1927 Eisenhauer ........ B01D 29/0018
210/289
2,217,692 A * 10/1940 McGill ................... C02F 1/004
210/123
(Continued)

FOREIGN PATENT DOCUMENTS

DE 2030050 11/1971
EP 0002342 A1 6/1979
(Continued)

OTHER PUBLICATIONS

Machine Language Translation of FR1000096A (Traitment Des Liquides), Feb. 1952, Retrieved from the internet on Aug. 3, 2016, <URL: https://worldwide.espacenet.com>, 3 pages.*
(Continued)

*Primary Examiner* — Matthew O Savage
(74) *Attorney, Agent, or Firm* — Knobbe Martens Olson & Bear LLP

(57) ABSTRACT

The present invention aims at limiting the pressure loss and smoothly discharging water treated by ion exchangers to the outside of the apparatus. Ion exchanging apparatus 1 has outer vessel 3 that has inner space 2; and ion exchanger support 4 that separates at least a part of inner space 2 into upper space 2a and lower space 2b and that can support ion exchangers to be loaded in upper space 2a. At least a part of an upper surface of the ion exchanger support is made from at least one screen which supports the ion exchangers and
(Continued)

which has a flow path allowing water treated by the ion exchangers to flow into the lower space 2b.

13 Claims, 12 Drawing Sheets

(51) Int. Cl.
    *B01J 47/022*      (2017.01)
    *B01J 47/04*      (2006.01)
    *B01J 49/00*      (2017.01)
    *B01D 24/46*      (2006.01)
    *B01D 24/12*      (2006.01)
    *C02F 1/44*      (2006.01)
    *C02F 103/34*      (2006.01)

(52) U.S. Cl.
    CPC ............ *B01J 49/0082* (2013.01); *C02F 1/42* (2013.01); *B01D 24/12* (2013.01); *B01D 24/4631* (2013.01); *C02F 1/44* (2013.01); *C02F 2103/34* (2013.01)

(58) Field of Classification Search
    USPC ........................................ 210/189, 281, 289
    See application file for complete search history.

(56) References Cited

U.S. PATENT DOCUMENTS

| | | | |
|---|---|---|---|
| 3,732,984 A | 5/1973 | Phillippi | |
| 4,388,417 A | 6/1983 | Down et al. | |
| 5,476,588 A * | 12/1995 | Nagaoka | B01D 29/012 210/499 |
| 2007/0131619 A1 * | 6/2007 | Izumi | B01J 39/043 210/672 |

FOREIGN PATENT DOCUMENTS

| | | | | |
|---|---|---|---|---|
| FR | 1000096 A | * | 2/1952 | ............ B01D 24/22 |
| JP | S29-12189 | | 9/1954 | |
| JP | 35-019279 | | 8/1960 | |
| JP | 38-028656 | | 12/1963 | |
| JP | S40-26294 | | 9/1965 | |
| JP | S44-29097 | | 12/1969 | |
| JP | 45-015251 | | 6/1970 | |
| JP | S45-36481 | | 11/1970 | |
| JP | S51-37367 | | 3/1976 | |
| JP | S51-140279 | | 11/1976 | |
| JP | S56-31816 | | 3/1981 | |
| JP | 57-050588 A | | 3/1982 | |
| JP | S58-049491 A | | 2/1983 | |
| JP | S58-76147 A | | 5/1983 | |
| JP | S61-11992 U | | 1/1986 | |
| JP | S61-29837 U | | 2/1986 | |
| JP | S61-44293 U | | 3/1986 | |
| JP | 62-001425 | | 1/1987 | |
| JP | S63-036889 A | | 2/1988 | |
| JP | 63-055498 A | | 3/1988 | |
| JP | 06-003442 U | | 1/1994 | |
| JP | 07-241409 A | | 9/1995 | |
| JP | 09-024215 A | | 1/1997 | |
| JP | 10-043510 A | | 2/1998 | |
| JP | 10-043610 | | 2/1998 | |
| JP | 2000-167551 | | 6/2000 | |
| JP | 2000-167551 A | | 6/2000 | |
| JP | 2001-239262 | | 9/2001 | |
| JP | 2006-159013 A | | 6/2006 | |
| JP | 2009-142714 A | | 7/2009 | |
| KR | 1996-0005032 | | 6/1996 | |
| WO | 2009/149311 A1 | | 12/2009 | |
| WO | 2010/016410 A1 | | 2/2010 | |

OTHER PUBLICATIONS

Rejection Notice dated Oct. 7, 2014 in corresponding JP Application No. 2013-515072.
Extended European Search Report dated Oct. 14, 2014 in corresponding EP Application No. 12786373.6.
Office Action dated May 19, 2015 in KR application No. 10-2013-7030624.
Office Action issued Nov. 30, 2016 in corresponding KR application No. 10-2013-7030624.

* cited by examiner

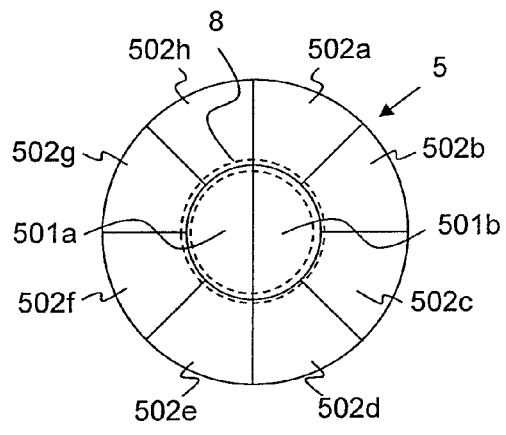
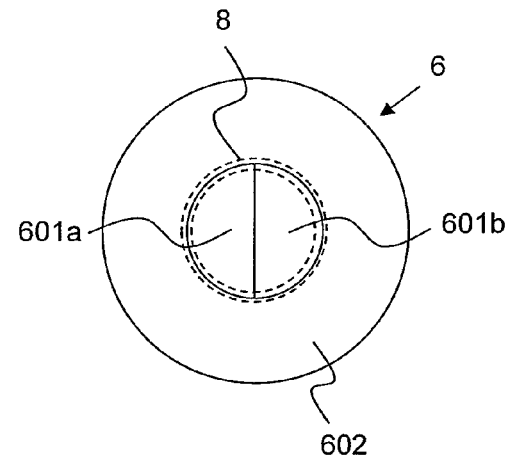
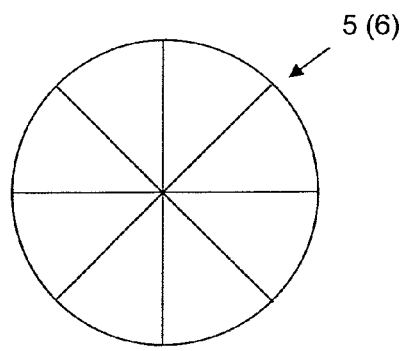
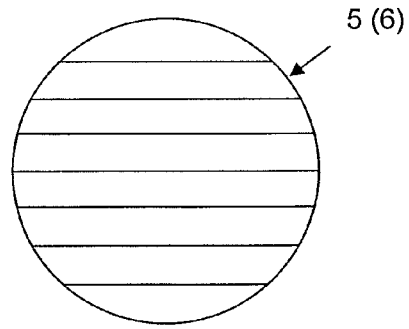
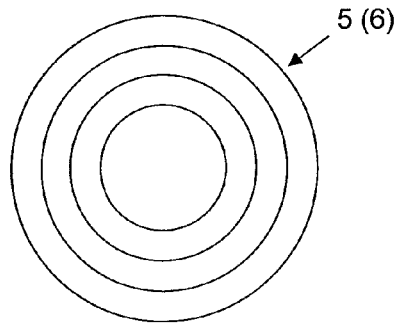

ION EXCHANGING APPARATUS

CROSS-REFERENCE TO RELATED APPLICATIONS

This application is the U.S. National Phase under 35. U.S.C. §371 of International Application PCT/JP2012/061542, filed May 1, 2012, which claims priority to Japanese Patent Application No. 2011-110443, filed May 17, 2011. The disclosures of the above-described applications are hereby incorporated by reference in their entirety. The International Application was published under PCT Article 21(2) in a language other than English.

TECHNICAL FIELD

The present invention relates to an ion exchanging apparatus, particularly to the structure of a demineralization tower or a regeneration tower that is installed in a condensate treatment system of a thermal power plant or a nuclear power plant.

BACKGROUND ART

In a thermal power plant or a nuclear power plant, a steam generator etc. generates steam from supplied water, and the generated steam drives a turbine in order to generate electric power. The steam that was used to drive the turbine is treated by a condensate treatment system after the steam is condensed by the condenser, and the condensate is again supplied to the steam generator etc. The condensate treatment system installed in a thermal power plant or a nuclear power plant is required, on the premise that a large amount of condensate can be treated, to remove dissolvable impurities (ionic impurities) in the condensate and to stably ensure the water quality required for the power generating facility. The ionic impurities are generated during normal operations. However, they are also generated when seawater or lake water etc., which is used as cooling water for a condenser, flows into the condensate system due to an unexpected leakage.

Generally, a condensate treatment system has a demineralization tower that removes ionic impurities in the condensate. FIGS. 1A to 1C show examples of prior art demineralization towers that are generally used. FIG. 1A is a sectional view of demineralization tower 101a that is generally used in a pressurized water reactor nuclear power plant or in a thermal power plant. An example is also disclosed in Patent Literature 1. FIG. 1B is a sectional view of demineralization tower 101b that is generally used in a boiling water reactor nuclear power plant. These demineralization towers are generally provided with mixed bed type resin-loaded layer 121a, 121b in which cation exchange resin and anion exchange resin are loaded.

In demineralization tower 101a shown in FIG. 1A, ion exchange resin is loaded in the lower space of demineralization tower 101a. Condensate inlet pipe 111a, i.e., an inlet pipe for condensate to be demineralized, is connected to the upper part of demineralization tower 101a. Water collecting pipes 123 for the condensate, i.e., pipes that collect condensate after it is demineralized, are provided in resin-loaded layer 121a of the ion exchanging resin. Water collecting pipes 123 are made from a plurality of annular pipes and have many water collecting openings formed thereon. Water collecting pipes 123 may be covered with filter cloths. Water collecting pipes 123 are connected to outlet pipes 115a, which extend to the outside of demineralization tower 101a through the bottom of demineralization tower 101a.

In demineralization tower 101b shown in FIG. 1B, support plate 104 for ion exchange resin is provided in the lower space of demineralization tower 101b. The ion exchange resin is loaded above support plate 104. The space below support plate 104 is not loaded with the ion exchange resin, serving as a space for collecting the demineralized condensate. The lower space is connected to outlet pipe 115b that extends to the outside of demineralization tower 101b through the bottom thereof. FIG. 1C is an enlarged view of part "A" in FIG. 1B. Support plate 104 has many openings 104a formed thereon, and each opening 104a is provided with cap-shaped strainer 135. As also disclosed in Patent Literatures 2 and 3, strainer 135 has strainer member 135b that is circumferentially arranged around shaft 135a and that is fixed, together with fixing jig 135c, to support plate 104 by means of a nut (not shown). Support member 104 may be flat, but alternatively may be formed in a downwardly curved concave in order to reduce the bending stress, as shown by the dashed line shown in FIG. 1B.

Patent Literature 1: JP10-351297A
Patent Literature 2: JP9-24215A
Patent Literature 3: JP7-2414069A
Patent Literature 4: WO2010/16410

SUMMARY OF THE INVENTION

Problem to be Solved by the Invention

It is difficult for such an ion exchanging apparatus to smoothly discharge the water that is treated by the ion exchangers to the outside of the apparatus. In the demineralization tower shown in FIG. 1A, water flows through water collecting pipes 123. In the demineralization tower shown in FIG. 1B, water flows through strainers 135 from the sides thereof. In other words, the pressure loss tends to increase due to the limited cross section of the flow path for the treated water.

The present invention was made in view of the above-described problem and aims at providing an ion exchanging apparatus that has low pressure loss and that can smoothly discharge the water treated by ion exchangers to the outside of the apparatus.

Means to Solve the Problem

An ion exchanging apparatus according to one embodiment of the present invention comprises an outer vessel that has an inner space and an ion exchanger support that separates at least a part of the inner space into an upper space and a lower space and that can support ion exchangers to be loaded in the upper space. At least a part of an upper surface of the ion exchanger support is made from at least one screen. The screen supports the ion exchangers and has a flow path that allows water treated by the ion exchangers to flow into the lower space.

At least a part of the upper surface of the ion exchanger support is made from at least one screen which has a flow path that allows the treated water to flow into the lower space. Accordingly, the cross section of the flow path can be easily ensured and the pressure loss can be reduced.

Effect of the Invention

Thus, according to the present invention, it is possible to provide an ion exchanging apparatus that has low pressure loss and that can smoothly discharge the water treated by ion exchangers to the outside of the apparatus.

BRIEF DESCRIPTION OF DRAWINGS

FIG. 6A is a schematic diagram showing a separation pattern for the screen and the first screen support plate.

FIG. 6B is a schematic diagram showing a separation pattern for the screen and the first screen support plate.

FIG. 6C] is a schematic diagram showing a separation pattern for the screen and the first screen support plate.

FIG. 6D is a schematic diagram showing a separation pattern for the screen and the first screen support plate.

FIG. 6E is a schematic diagram showing a separation pattern for the screen and the first screen support plate.

EMBODIMENTS FOR CARRYING OUT THE INVENTION

The ion exchanging apparatus according to the present invention can typically be utilized for a demineralization tower (a demineralizing apparatus) that is used to treat condensate in a power generating facility. The ion exchanging apparatus according to the present invention can also be used for a regeneration tower (a regeneration apparatus) that regenerates ion exchangers after they are used to treat condensate in a power generating facility. Moreover, the ion exchanging apparatus can be applied to every kind of vessel that holds ion exchangers and to every kind of vessel to which ion exchangers are transferred from the ion exchangers vessels that the hold ion exchangers. Next, embodiments of the ion exchanging apparatus used for a demineralization tower will be mainly described.

Figure 2:
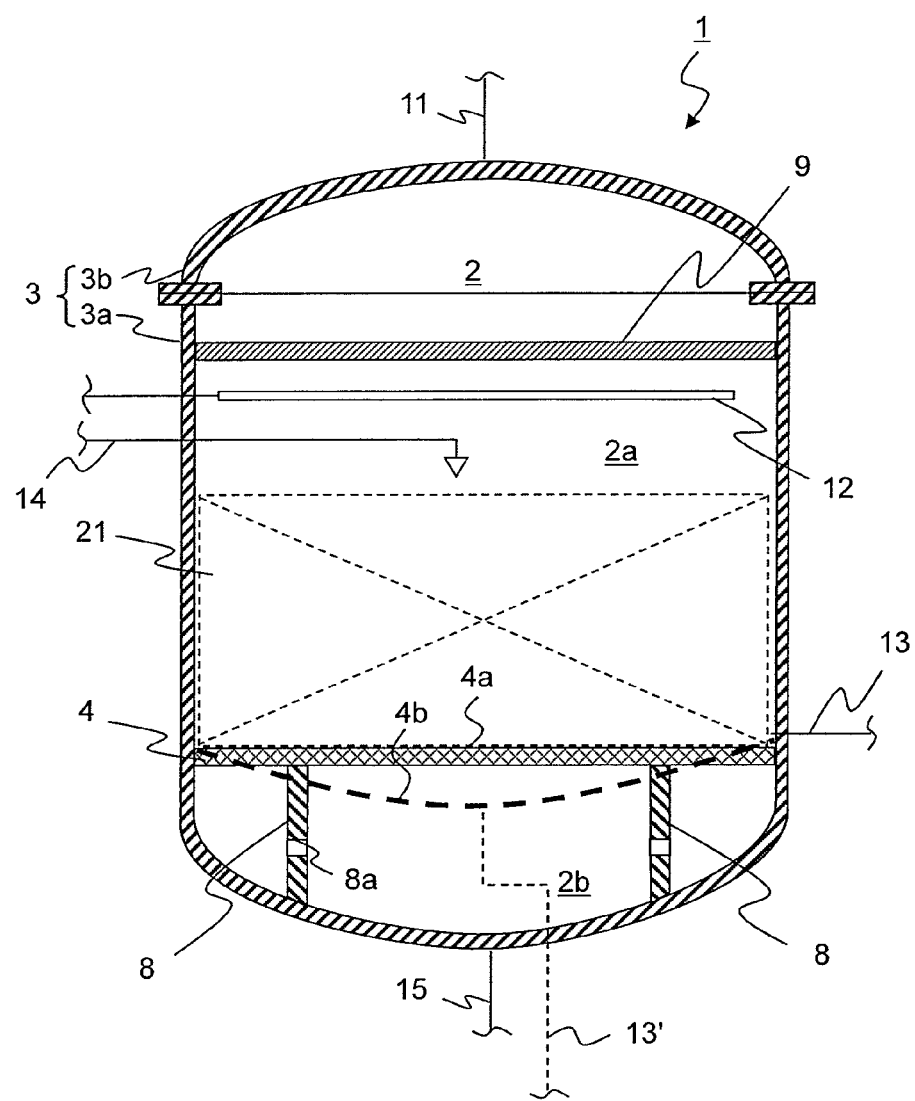
FIG. 2 is a sectional view of a demineralization tower according to the first embodiment of the present invention.

FIG. 2 is a sectional view of a demineralization tower according to the first embodiment of the present invention. Demineralization tower 1 has outer vessel 3 that has inner space 2. Demineralization tower 1 further has ion exchanger support 4 that separates inner space 2 into upper space 2a and lower space 2b. Ion exchanger support 4 can support ion exchangers, which are loaded in upper space 2a, on upper surface 4a thereof that extends as a smooth surface. Ion exchanger loaded layer 21 shown in FIG. 2 represents the space in which ion exchangers are loaded.

Ion exchangers can be selected depending on the quality of condensate. Examples of the ion exchangers include granular ion exchange resin (hereinafter referred to as ion exchange resin), ion exchange fibers and monolithic porous ion exchangers. Among others, ion exchange resin is preferable because it is most common, because it has excellent ion removal capability and high ion exchanging capacity and because it is easy to regenerate. Examples of ion exchange resin include anion exchange resin and cation exchange resin. Examples of anion exchange resin include strong-base anion exchange resin and weak-base anion exchange resin. Examples of cation ion exchange resin include strong-acid cation exchange resin and weak-acid cation exchange resin. Only one type of ion exchange resin may be used, and alternatively, a combination of more than one type of ion exchange resin may be used. The following descriptions will be made based on ion exchange resin.

The patterns for loading the ion exchange resin can be determined depending on the quality of condensate and the quality required for the deionized water. Examples of the patterns for loading the ion exchange resin include a single bed of the anion exchange resin, a single bed of the cation exchange resin, a mixed bed of the anion exchange resin and the cation exchange resin and multiple beds of the anion exchange resin and the cation exchange resin. In particular, the mixed bed of the anion exchange resin and the cation exchange resin is preferable because it can effectively remove cation components and anion components, which are ionic impurities in the condensate.

Outer vessel 3 of demineralization tower 1 has vessel main body 3a and upper lid 3b that can be installed on vessel main body 3a. Vessel main body 3a and upper lid 3b form a part of the pressure vessel. Thus, vessel main body 3a preferably has a cylindrical shape, and upper lid 3b is preferably installed on vessel main body 3a by means such as bolts that is resistive to the inner pressure. Upper lid 3b is detachably (removably) installed on vessel main body 3a, but alternatively may be attached by means of a hinge or the like that only allows opening and closing of upper lid 3b. Condensate inlet pipe 11 is detachably connected to upper lid 3b. Condensate outlet pipe 15 is connected to the bottom of vessel main body 3a.

Figure 3:
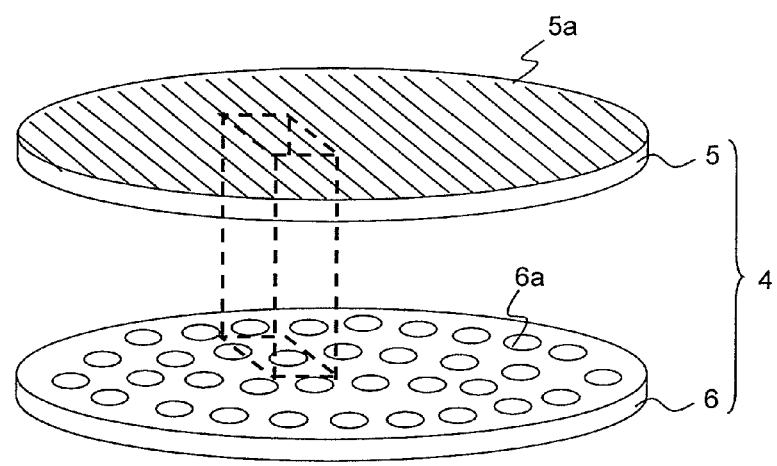
FIG. 3 is an exploded perspective view of the ion exchanger support.
Figure 4:
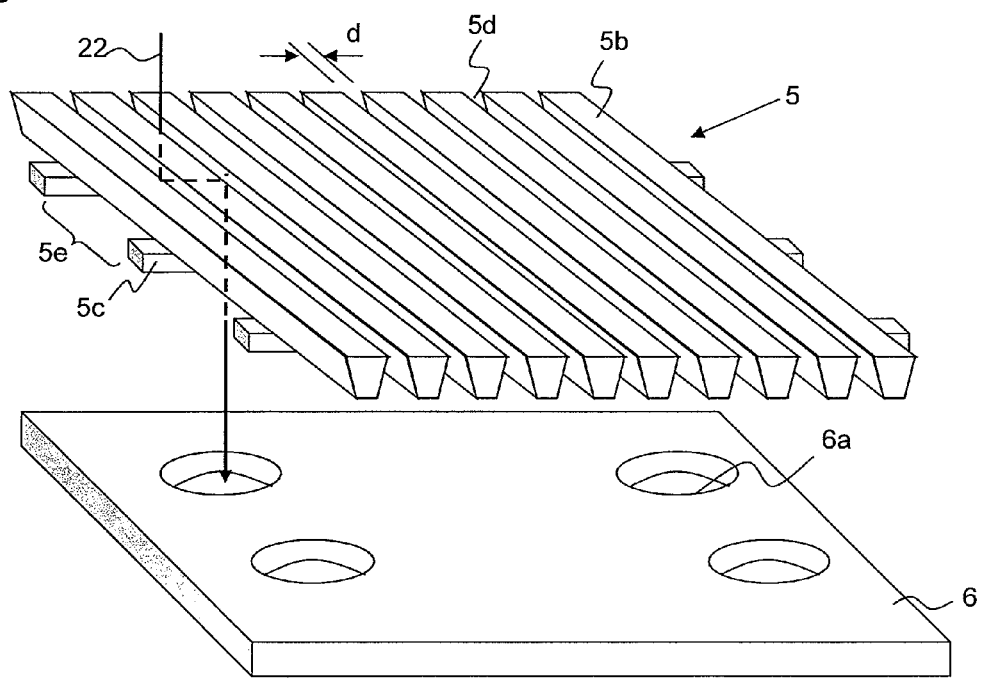
FIG. 4 is a partial exploded perspective view of the ion exchanger support in the area shown by the dashed line shown in FIG. 3.

Demineralization tower 1 has ion exchanger support 4 that is located in inner space 2. FIG. 3 shows an exploded perspective view of ion exchanger support 4, and FIG. 4 shows a partial exploded perspective view of the ion exchanger support in the area shown by the dashed lines shown in FIG. 3.

Ion exchanger support 4 has circular screen 5 that supports the ion exchangers and circular first screen support plate 6 that is located below screen 5 and that supports screen 5. Screen 5 has a slightly smaller outer diameter than the inner diameter of vessel main body 3a so that screen 5 forms the entire area of upper surface 4a of ion exchanger support 4. In the present embodiment, upper surface 4a of ion exchanger support 4, i.e., upper surface 5a of screen 5, is flat.

Screen 5 is made from a plurality of wire members 5b that is positioned apart from each other and that extend in one direction and a plurality of support rods 5c that extend perpendicular to wire members 5b and that support wire members 5b. Wire members 5b and support rods 5c are made of metal or resin, and are fixed to each other by proper means, which is for example welding when they are made of metal and which is for example an adhesive when they are made of resin. Wire members 5b and support rods 5c may not be perpendicular to each other and may be crossed at any angles as long as wire members 5b can be fixed.

The cross sections of wire members 5b are not especially limited, but a triangular cross section with one side facing upward or a trapezoidal cross section with the longer side facing upward are particularly preferable. Since the spaces between wire members 5b are smaller at the upper side and larger at the lower side, impurities can be prevented from being caught in the space between wire members 5b. Wire members 5b may also have cross sections such as a home base shape, a semi-circular shape or a semi-elliptic shape. Space d between wire members 5b at the upper surfaces thereof is selected such that ion exchange resin does not flow through the space. However, it is desirable that the space be determined based on the required flow rate, pressure loss and so on because the space affects the ratio of opening of ion exchanger support 4.

Screen 5 is not limited to the above-mentioned configuration, and various configurations can be used as long as screen 5 supports the ion exchange resin and has openings or flow path that allow the condensate to pass through. Examples of the screen include a wire net, such as a woven wire net and a punched-out wire net.

Since screen 5 is a circular plate having an outer diameter that is nearly the same as the inner diameter of vessel main body 3a, flow path 22 can be formed on the entire surface of screen 5. In the prior art configuration shown in FIG. 1A, the cross section of the flow path is limited by the openings of the annular water collecting pipes because only a limited number of openings can be formed on only a limited number of annular water collecting pipes. As a result, a large differential pressure is generated in the water collecting pipes. A larger differential pressure is generated when the water collecting pipes are covered with filter cloths. A large differential pressure increases pump head and operation cost especially when the condensate is supplied at a high flow velocity. The increased pump head further increases design pressure of the system that includes the ion exchanging apparatus, thereby increasing the overall plant cost. In the prior art configuration shown in FIG. 1B, the cross section of the flow path is limited by the cross section of the flow path of the strainers and a similar problem occurs because the density with which the strainers are arranged is limited. The present embodiment is effective especially when the condensate is treated at a high flow velocity because the limitation of the cross section of the flow path is small.

First screen support plate 6 has nearly the same outer diameter as screen 5. First screen support plate 6 is preferably made of metal because the first screen support plate supports the dead weights of screen 5 and the ion exchange resin in addition to the differential pressure load that is generated at screen 5 and the ion exchange resin. First screen support plate 6 may be formed integrally with or detachably from screen 5.

Figure 5:
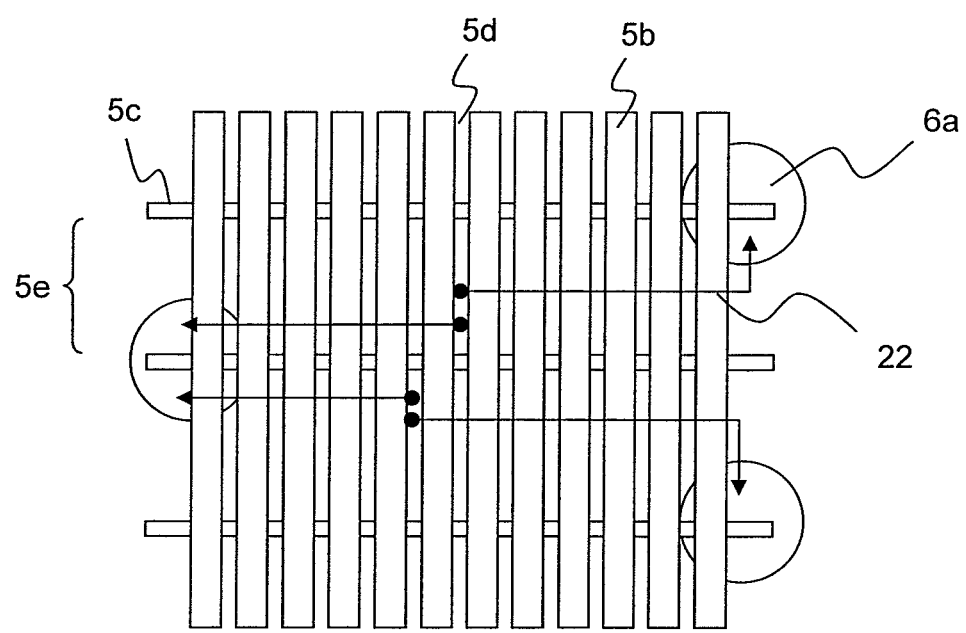
FIG. 5 is a plan view showing the positional relationship between the screen and the openings of the first screen support plate.

First screen support plate 6 has a plurality of openings 6a. FIG. 5 shows the positional relationship among wire members 5b, support rods 5c, both of which form screen 5, and openings 6a of first screen support plate 6. As will be understood from FIGS. 4 and 5, the condensate passes through the ion exchange resin supported by ion exchanger support 4, passes through space 5d between the adjacent wire members 5b, enters space 5e between the adjacent support rods 5c, flows into openings 6a of first screen support plate 6, and then flows into lower space 2b. As shown in FIG. 5, each space 5e that is delimited by the adjacent support rods 5c is, without exception, connected to at least one of openings 6a such that condensate that enters space 5e delimited by adjacent support rods 5c is discharged to lower space 2b. Opening 6a may extend over more than one space 5e, as shown in FIG. 5, but alternatively may be connected to only one space 5e. Thus, screen 5 and first screen support plate 6 have flow path 22 that allows water that is treated with ion exchange resin to flow into lower space 2b. The condensate that is discharged to lower space 2b is directed to the bottom of demineralization tower 1 and is then discharged to the outside of demineralization tower 1 from condensate outlet pipe 15 located at the bottom of demineralization tower 1.

Referring to FIG. 2, ion exchanger support 4 is supported on the inner circumferential surface of vessel main body 3a. According to the present embodiment, ion exchanger support 4 is also supported by cylindrical support member 8. Support member 8 is located in inner space 2, with the lower end thereof fixed to the bottom of outer vessel 3. Ion exchanger support 4 that supports ion exchange resin is subjected to a large bending stress. Ion exchanger support 4 is supported by support member 8 at the intermediate part between the center and the outer circumference of ion exchanger support 4 so that a part of the dead weight of the ion exchange resin and ion exchanger support 4 is transferred to the bottom of outer vessel 3. Thus, the wall thickness of ion exchanger support 4 can be reduced. Support member 8 has openings 8a on the side surface thereof, thereby allowing water and air to pass through openings 8a. The size of openings 8a is preferably determined depending on the flow rates of the water and air that flow in the inside space and the outside space of support member 8. A pillar-shaped member having a polygonal cross section, such as a square cross section, may be used instead of cylindrical support member 8. Alternatively, a large number of pillar-shaped supports may be arranged along a circle.

It is desirable that maintenance of ion exchanger support 4, particularly screen 5, be periodically carried out for the purpose of removing foreign matter and cleaning. The maintenance of ion exchanger support 4 can be easily carried out since ion exchanger support 4 has a simple structure in which screen 5 and first screen support plate 6 are assembled. Screen 5 and first screen support plate 6 can also be easily removed from demineralization tower 1 together or independently.

In addition, screen 5 and/or first screen support plate 6 may have a separable structure. The separable structure may improve maintainability. FIG. 6A to FIG. 6E schematically show separation patterns for screen 5 and first screen support plate 6. Screen 5 and first screen support plate 6 may be separated as shown in FIG. 6A and FIG. 6B, respectively. First screen support plate 6 may be separated into two semi-circular inner portions 601a, 601b and annular outer portion 602. First screen support plate 6 is preferably separated such that the outer peripheries of inner portions 601a, 601b and the inner periphery of annular outer portion 602 are supported by support member 8. Screen 5 may be separated into two inner portions 501a, 501b, which have the same shapes and sizes as two inner portions 601a, 601b of first screen support plate 6, and eight outer portions 502a to 502h that are equally separated into fan shapes. Maintainability is further improved by integrating inner portion 501a of screen 5 with inner portion 601a of first screen support plate 6 and by integrating inner portion 501b of screen 5 with inner portion 601b of first screen support plate 6.

Alternatively, screen 5 and/or first screen support plate 6 may be separated into portions having the same shapes according to the lines that pass through the center, as shown in FIG. 6C. Alternatively, screen 5 and/or first screen support plate 6 may be separated into portions by a plurality of parallel lines, as shown in FIG. 6D. Alternatively, screen 5 and/or first screen support plate 6 may be separated into concentric circles, as shown in FIG. 6E. The number of separated portions is not limited, but 4 to 18 are preferable. When first screen support plate 6 has a separable structure, beam members (not shown) that support first screen support plate 6 are preferably provided.

Showering pipe 12 that sprays water on at least a part, or preferably the entire area, of upper surface 5a of screen 5 extends in inner space 2. Showering pipe 12 has a structure in which spray nozzles are arranged at a predetermined interval on an annular pipe. The spray nozzles are preferably of the full cone spray type because this type easily ensures the required flow rate and has a wide spray range. Alternatively, the spray nozzles may be of the straight type, fan-shaped type, hollow cone type or flat spray type. Ion exchange resin can be fluidized and the amount of residual ion exchange resin after removal can be reduced by spraying the showering water onto the entire area of screen 5.

Flow adjusting plate 9 is further provided immediately below condensate inlet pipe 11 in inner space 2. Flow adjusting plate 9 is a generally circular plate member that has many openings and that uniformly distributes condensate, which flows in through condensate inlet pipe 11, to ion exchanger loaded layer 21.

The regeneration of ion exchange resin requires removing and loading ion exchange resin. Ion exchange resin removing pipe 13 is provided in order to remove ion exchange resin. Removing pipe 13 is open at the sidewall of outer vessel 3 near upper surface 4a of ion exchanger support 4 (near the bottom of ion exchanger loaded layer 21). Ion exchange resin loading pipe 14 for loading ion exchange resin is provided above ion exchanger loaded layer 21 in order to load ion exchange resin.

Generally, the resin removing port is located at the lowest part of the resin loaded layer. In the example shown in FIG. 1A, the resin removing port (removal pipe 113a) is located at the lowest part of demineralization tower 101a. In the example shown in FIG. 1B, the resin removing port (removal pipe 113b) is located immediately above support plate 104. However, resin is made of very fine granules and tends to remain in the demineralization tower. In the example shown in FIG. 1A, resin tends to remain near annular water collecting pipes 123. In the example shown in FIG. 1B, resin tends to remain near strainers 135. Further, if resin that adsorbs impurities remains at the lowest part of the resin loaded layer, the impurities may be disadvantageously discharged when water flows. Thus, there is a need to improve the efficiency of collecting resin.

Upper surface 5a of screen 5 corresponds to upper surface 4a of ion exchanger support 4, thereby forming upper surface 4a of ion exchanger support 4. Ion exchangers are supported on the upper surface that extends as a smooth surface. The contour of the surface that extends as a smooth surface does not have irregularities. Specifically, ion exchanger support 4 has screen 5 that supports ion exchangers, and upper surface 5a of screen 5 forms at least a part of upper surface 4a of ion exchanger support 4. In other words, upper surface 5a of screen 5 matches upper surface 4a of ion exchanger support 4. Since upper surface 5a of screen 5, i.e., upper surface 4a of ion exchanger support 4, is a smooth plane free of irregularities, movement of the ion exchange resin is not prevented when it is removed and the ion exchange resin can be smoothly discharged. Ion exchange resin can be moved on the upper surface of the ion exchanger support without being obstructed by irregularities, and collection efficiency can be improved as compared to prior art.

Figure 1A:
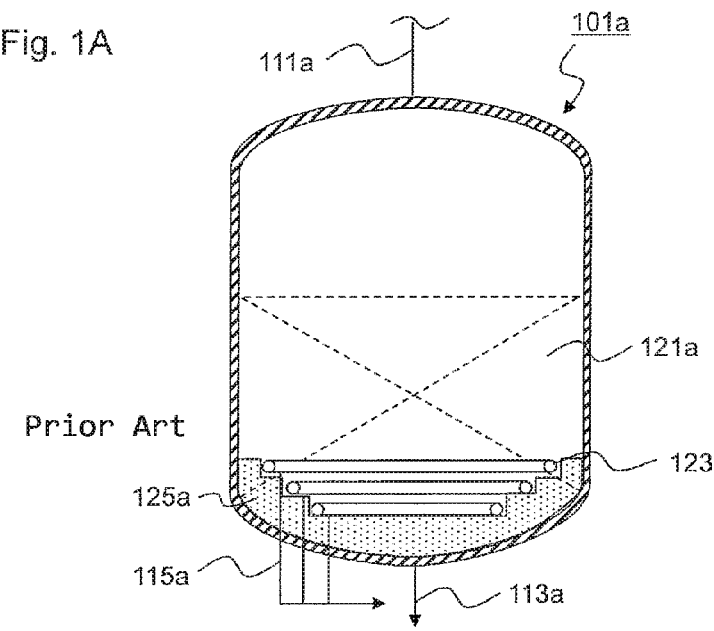
FIG. 1A is a sectional view of an example of a prior art demineralization tower.
Figure 1B:
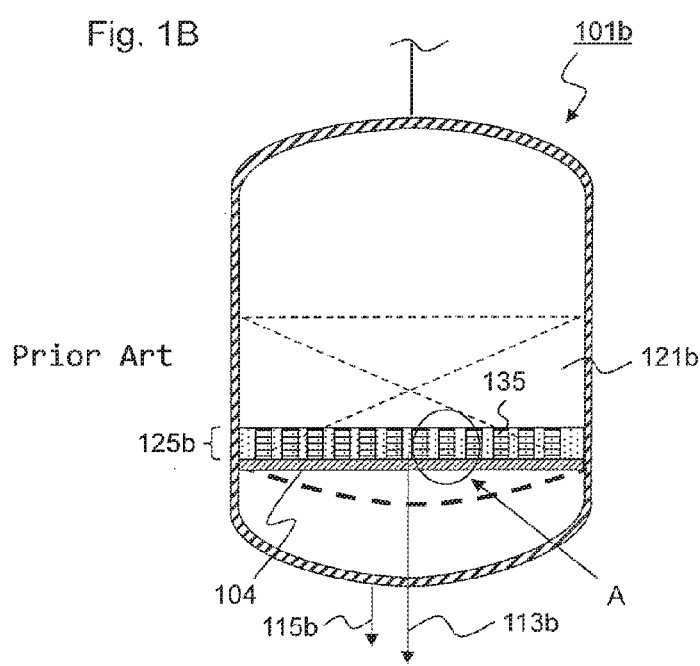
FIG. 1B is a sectional view of an example of a prior art demineralization tower.
Figure 1C:
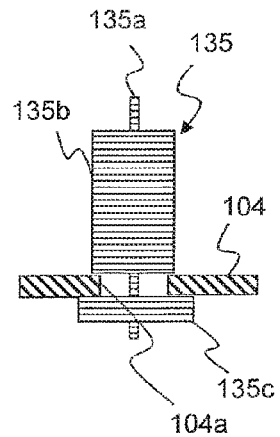
FIG. 1C is a sectional view of an example of a prior art demineralization tower.

Moreover, in the example shown in FIG. 1A, in which water collecting pipes 123 are three-dimensionally located along the bottom of demineralization tower 101a, a space for installing water collecting pipes 123 is required between water collecting pipes 123 and the bottom of demineralization tower 101a. Ion exchange resin is also loaded in this space. However, demineralized water mainly flows into water collecting pipes 123 through the ion exchange resin above water collecting pipes 123. Thus, the ion exchange resin loaded in this space does not satisfactorily contribute to the demineralizing function and, in view of design, is treated as non-functioning resin 125a that does not contribute to demineralization. In the example shown in FIG. 1B, strainers 135 are located such that they protrude from supporting section 104. Ion exchange resin is also loaded at the sides of strainers 13, but demineralized water mainly flows from above strainers 135 into strainers 135. Thus, the ion exchange resin loaded at the sides of strainers 135 does not satisfactorily contribute to the demineralizing function and, in view of design, is treated as non-functioning resin 125*b* that does not contribute to demineralization. Thus, both conventional configurations cause non-functioning resin and there is a need to improve operation cost.

According to the present embodiment, since upper surface 5*a* of screen 5 matches upper surface 4*a* of ion exchanger support 4, the amount of ion exchanges that do not function can be reduced and the efficiency of using ion exchangers can be improved.

The upper surface of ion exchanger support 4 may have a downwardly curved concave surface (upper surface 4*b*), i.e., a bowl shape, as shown by the dashed line shown in FIG. 2. In this case, removal pipe 13' for ion exchange resin may be connected to the lowest part of the concave surface and may extend to the outside of demineralization tower 1 through ion exchanger support 4. Screen 5 and first screen support plate 6 are both formed substantially in the same shape, i.e., a downwardly curved bowl shape. Since bending stress is reduced due to the bowl shape, support member 8 may be omitted. Of course, it is also possible to provide support member 8. Since upper surface 4*b* of ion exchanger support 4 is a smooth concave surface free of irregularities, the movement of ion exchange resin is not obstructed when the resin is removed. In addition, removal pipe 13' for ion exchange resin is located at the lowest part of the concave surface. Accordingly, ion exchange resin can be further smoothly removed.

Figure 7:
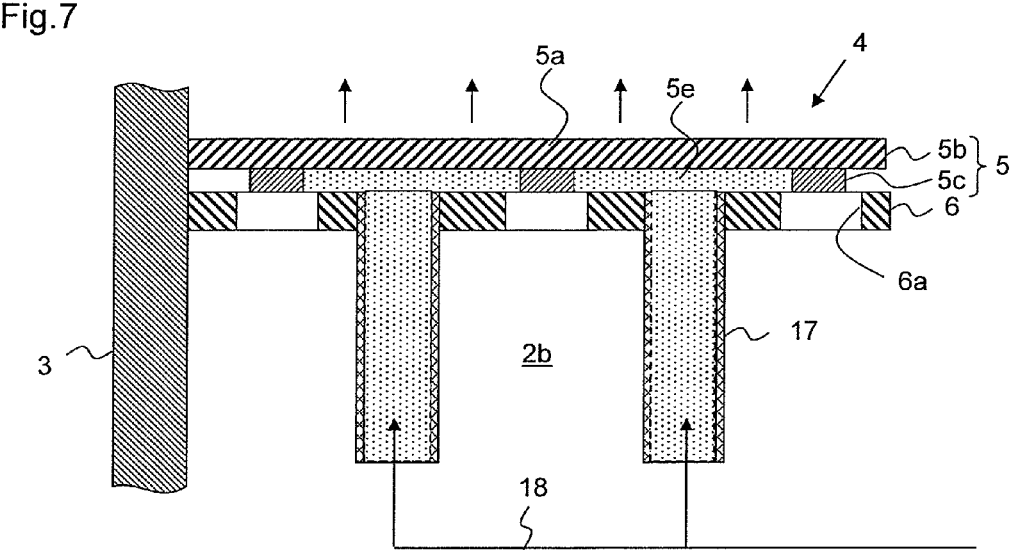
FIG. 7 is a sectional view of the ion exchanger support.
Figure 8:
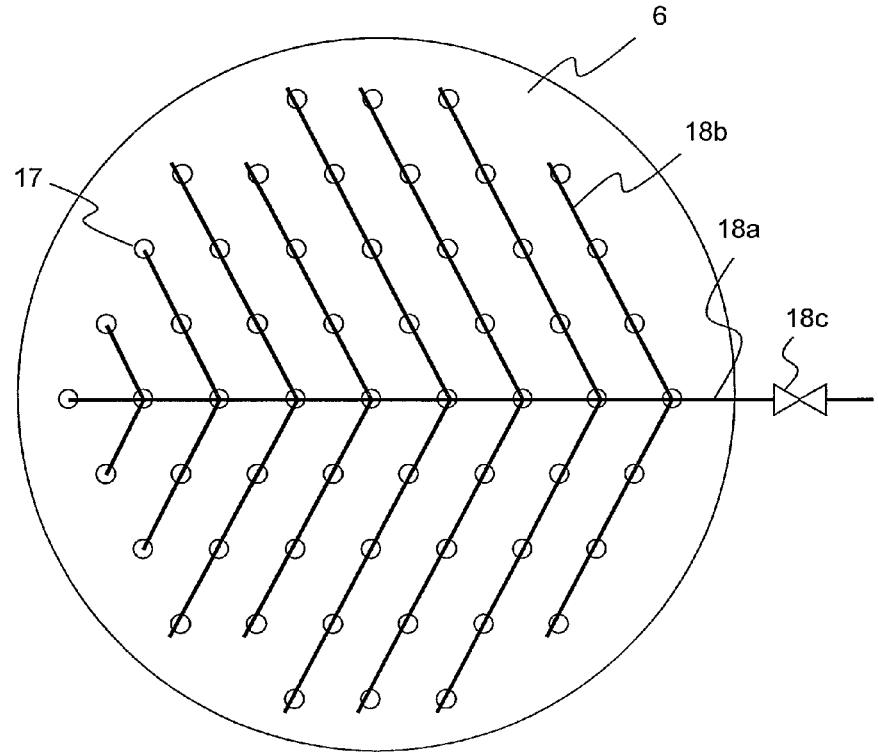
FIG. 8 is a bottom view of the ion exchanger support (first screen support plate).

FIG. 7 is a sectional view of ion exchanger support 4. First screen support plate 6 is provided with a plurality of pipes 17. Pipes 17 may be fixed to first screen support plate 6 by welding etc. or may be detachably installed on first screen support plate 6. FIG. 8 is a bottom view of ion exchanger support 4 (first screen support plate 6), in which openings 6*a* are not illustrated. Pipe 18 is arranged in lower space 2*b*. Pipe 18 distributes air supplied from the outside of outer vessel 3 to a plurality of points on screen 5, which is specifically a plurality of pipes 17. Pipe 18 is air supply means that consist of main pipe 18*a* connected to an air supply source (not shown) and a plurality of branch pipes 18*b* that branch from main pipe 18*a*. Each pipe 17 is connected to main pipe 18*a* or to one of branch pipes 18*b* so that air is supplied from the air supply source to pipe 17. Valve 18*c* is provided on main pipe 18*a*. Valve 18*c* is closed when condensate is treated so that the treated condensate is prevented from flowing into the air supply source. The configuration of the pipes is not limited to this. Alternatively, the pipes may have a configuration in which annular pipes that have different diameters are concentrically located and are connected to each other. Pipes 17 may be connected to openings 6*a*. In this case, pipes 17 work as a flow path for condensate when condensate flows and work as air supply means when air is supplied.

When ion exchange resin is removed, valve 18*c* is opened so that an upward airflow is supplied to a plurality of points on screen 5, i.e., to a plurality of pipes 17. The air flows in pipes 17, then flows in spaces 5*e* between the adjacent support rods 5*c* and finally flows in openings 5*d* (not shown in FIG. 7) between the adjacent wire members 5*b*. The air passes through openings 5*d*, turning upwardly at upper surface 5*a* of screen 5 so that the air is discharged from a plurality of points on screen 5. Since screen 5 has a significantly large number of wire members 5*b*, airflow is uniformly discharged from substantially the entire area of upper surface 5*a* of screen 5. Thus, ion exchange resin is lifted from upper surface 5*a* of screen 5 and is smoothly moved to the outside of demineralization tower 1 in cooperation with sprayed water that is supplied from above.

It is also possible to use the ring pipes as an air supply source in the prior art configuration shown in FIG. 1A. However, air can only be supplied from ring pipes, and therefore it is difficult to uniformly supply air to ion exchange resin. Air can be relatively uniformly supplied in the prior art configuration shown in FIG. 1B, but the lowest layer of ion exchange resin cannot be satisfactorily fluidized because air cannot be directly supplied to the contact interface between support plate 104 and ion exchange resin. It is possible in the present embodiment to more uniformly supply air to the lowest layer of ion exchange resin.

The above-mentioned air supply means may be used to backwash ion exchange resin. Backwashing is an operation to supply an upward airflow from below ion exchanger support 4 while ion exchange resin is immersed in water. The supplied air becomes bubbles when passing through ion exchanger support 4, and rises within ion exchanger loaded layer 21. Meanwhile, the upward flow of air bubbles carries out air scrubbing washing of ion exchange resin so that substances that adhere to the surface of ion exchange resin are peeled off.

Figure 9:
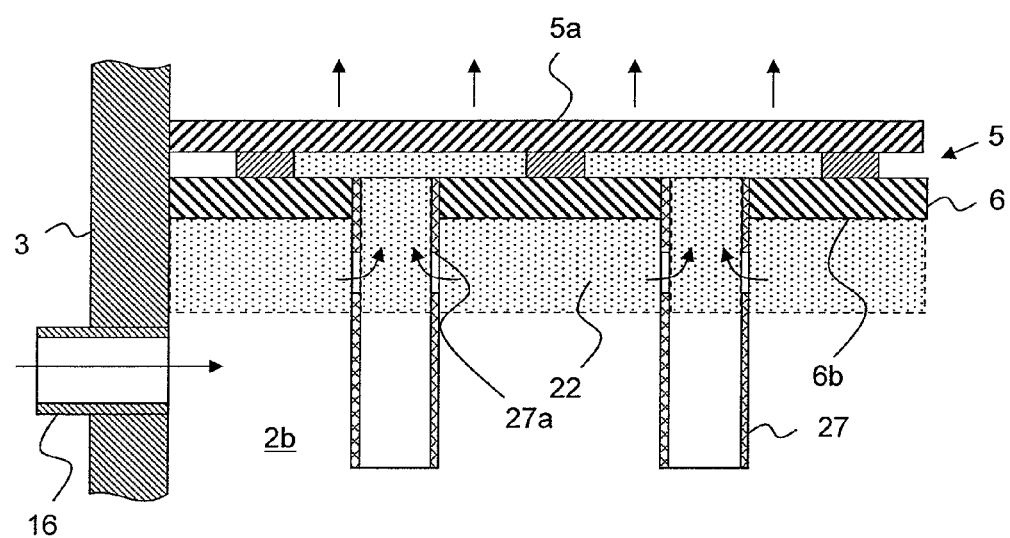
FIG. 9 is a sectional view of another example of the air supply means.

FIG. 9 shows another example of air supply means. Air supply nozzles 16 that are open to lower space 2*b* are provided on the side surface (or the bottom) of outer vessel 3. A plurality of pipes 27 that extend in lower space 2*b* is provided on first screen support plate 6 of ion exchanger support 4. These pipes 27 may be fixed to first screen support plate 6 by welding etc., as in the above-mentioned embodiments, or may be detachably installed on first screen support plate 6. Pipes 27 have nearly the same structure as pipes 17 shown in FIGS. 7 and 8, but openings 27*a* are formed on a part of the side surface of each pipe 27. The air supplied from air supply nozzle 16 remains near the lower surface of first screen support plate 6, forming an air layer depending on the pressure loss of openings 27*a* so that the air flows from openings 27*a* into pipes 27 (refer to the arrows shown in FIG. 9). In particular, when air supply nozzle 16 is open at the side surface of outer vessel 3, the lower ends of pipes 27 are preferably located below the lower end of air supply nozzle 16 in order to prevent the air supplied from air supply nozzle 16 from concentrating at specific pipes 27.

When ion exchange resin is removed, air is supplied from air supply nozzle 16 to lower space 2*b*. Lower space 2*b* is filled with water such as residual water and sprayed water. Thus, the supplied air remains near lower surface 6*b* of first screen support plate 6. Air layer 22 is formed in contact with nearly the entire area of lower surface 6*b* of first screen support plate 6 by adequately adjusting the flow rate of the air. The air in air layer 22 flows into pipes 27 through openings 27*a* of each pipe 27, flows along the same path as that in the above-mentioned embodiment, and is then discharged in an upward airflow from upper surface 5*a* of screen 5.

Figure 10:
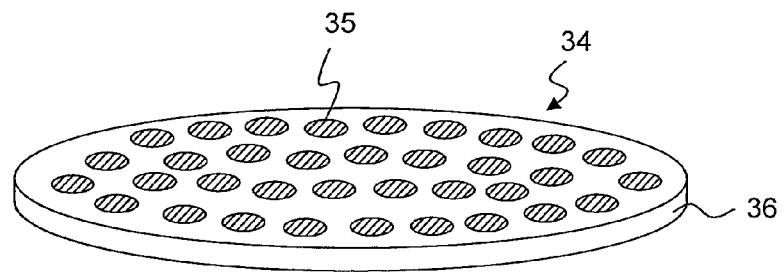
FIG. 10 is a perspective view of the ion exchanger support of a demineralization tower according to the second embodiment of the present invention.
Figure 11:
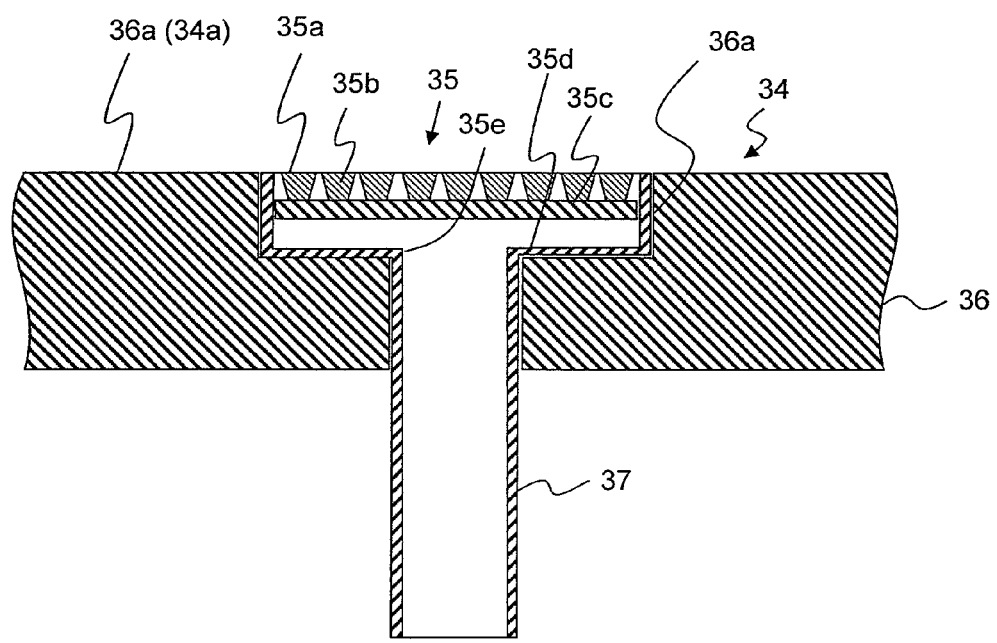
FIG. 11 is a partial sectional view of the ion exchanger support shown in FIG. 10.

FIG. 10 is a perspective view of ion exchanger support of a demineralization tower according to the second embodiment of the present invention. FIG. 11 is a partial sectional view of the ion exchanger support. According to the present embodiment, ion exchanger support 34 has a plurality of screens 35 that are positioned apart from each other. Each screen 35 is made from wire members 35*b* and support rods 35*c* that are similar to the wire members and support rods in the first embodiment, and each screen 35 is formed in a circular shape. Screen 35 is supported by dish-shaped screen support member 35*d*, which has opening 35*e* at the center of the bottom. Pipe 37 having the same structure as pipe 17 or 27, described above, is connected to opening 35e. Pipe 37 may be fixed to screen support member 35d by welding etc., or may be detachably installed on screen support member 35d. Pipe 37 is preferably configured to serve both as a flow path for condensate and as a supply path for air.

Ion exchanger support 34 further has second screen support plate 36. Second screen support plate 36 is a circular member similar to first screen support plate 6, and has a plurality of openings 36a into which screen support members 35d can be inserted. When screen support member 35d on which screens 35 is mounted is inserted into opening 36a, upper surface 35a of screen 35 is flush with upper surface 36a of second screen support plate 36. Thus, a plurality of screens 35 are supported by corresponding openings 36a, and each screen 35 matches upper surface 36a of second screen support plate 36 so that upper surface 35a of screen 35 form a part of upper surface 34a of ion exchanger support 34. The present embodiment can be preferably applied as a modification to the prior art configuration shown in FIG. 1B.

According to the present embodiment, second screen support plate 36 may be formed in a downwardly curved bowl shape. In this case, screens 35 are preferably inclined along upper surface 36a of second screen support plate 36 so that upper surface 36a of second screen support plate 36 becomes a smoothly curved surface.

According to the present embodiment, the air supply means described with reference to FIGS. 7 to 9 may also be provided.

Figure 12:
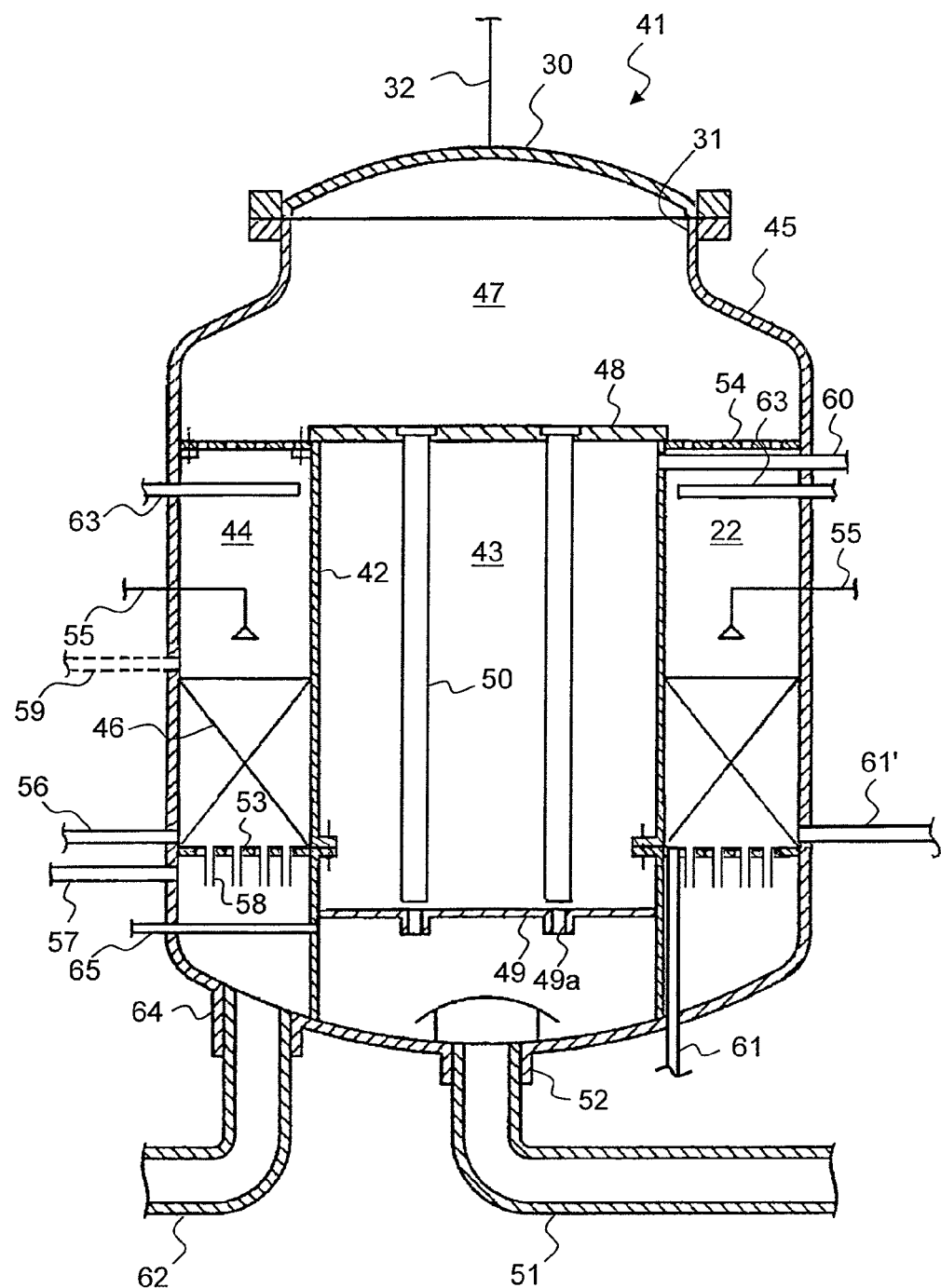
FIG. 12 is a partial sectional view of a demineralization tower (condensate demineralization tower) according to a third embodiment of the present invention.

FIG. 12 is a partial sectional view of demineralization tower 41 according to a third embodiment of the present invention. Demineralization tower 41 according to the present embodiment is a condensate demineralization tower having a filter section in part of the inner space. Specifically, the inner space of demineralization tower 41 is separated by inner wall 42 into a radially inner section and a radially outer section. The inner section is filter chamber 43 that accommodates filter elements 50 and that forms the filter section. The outer section is demineralization chamber 44 that forms a demineralization section. In the following embodiment, water passes through the filter section before it is treated by ion exchange resin. However, water may also pass through the filter section after it is treated by ion exchange resin.

According to the present embodiment, inner wall 42 having a generally cylindrical shape is provided concentrically with outer vessel 45. Inner wall 42 vertically extends to the bottom of outer vessel 45. The lower part of demineralization chamber 44 is ion exchange resin-loaded layer 46 that is loaded with ion exchange resin. The entire circumference of the lower end of inner wall 42 reaches the bottom of outer vessel 45, thereby completely separating the inside of inner wall 42 from the outside thereof. In contrast, the upper end of inner wall 42 terminates in the inner space. Thus, filter chamber 43 is connected to demineralization chamber 44 through upper space 47 of outer vessel 45 that is located above inner wall 42.

Inner wall 42 may have a thinner structure than outer vessel 45. This is because filter chamber 43 is located on the inner side of demineralization chamber 44 with inner wall 42 therebetween in the present embodiment and actually inner wall 42 is only subjected to a differential pressure that corresponds to the pressure loss that is generated in filter chamber 43 and demineralization chamber 44. Thus, material of inner wall 42 can be reduced, and thereby equipment cost of the condensate demineralization tower can be reduced.

Inner wall 42 has a high degree of freedom with respect to the shape and can easily have a polygonal cross section, such as a triangular cross section, a rectangular cross section, a hexagonal cross section or an octagonal cross section, as needed, since it is only subjected to a small differential pressure. However, inner wall 42 preferably has a cylindrical cross section or a polygonal cross section that is similar to a cylindrical cross section in order to ensure pressure resistance against the differential pressure and smooth flow of flushing water for ion exchange resin, which will be described later.

Partition plate 48 is supported on the upper end of inner wall 42. Partition plate 48 covers the inner space of inner wall 42, thereby defining the top surface of filter chamber 43. Distribution plate 49 that defines the bottom of filter chamber 43 is fixed on the lower part of inner wall 42.

Distribution plate 49 is, for example, a circular member having as many through holes 49a as filter elements 50. The space below distribution plate 49 is the central bottom region of outer vessel 45, where inlet nozzle 52 is provided. Inlet nozzle 52 is connected to inlet pipe 51, to which condensate is supplied. Hollow fiber membrane modules are particularly preferably used as filter elements 50. Condensate flows into outer vessel 45 through inlet nozzle 52, then penetrates through hollow fiber membranes into the inside thereof (inside holes of the hollow fiber membranes). Thereafter, the condensate flows into upper space 47 from the upper end of each hollow fiber membrane through the outlet port.

Annular ion exchanger support 53 that has the same cross section as demineralization chamber 44 is provided between the sidewall of outer vessel 45 and the outer surface of inner wall 42. Ion exchanger support 53 extends circumferentially and continuously, with the outer periphery extending along the sidewall of outer vessel 45 and with the inner periphery extending along the inner wall 42. The inner periphery of ion exchanger support 53 is fixed to the lower part of inner wall 42 by welding etc. Ion exchanger support 53 defines the bottom of demineralization chamber 44 and supports ion exchangers on the upper surface thereof, forming ion exchange resin-loaded layer 46. The space below ion exchanger support 53 is an outer circumferential bottom region of outer vessel 45, where outlet nozzle 64, to which outlet pipe 62 is connected, is provided.

Ion exchanger support 53 may have the same configuration as the ion exchanger support in the first embodiment and the ion exchanger support in the second embodiment. In the former case, an annular screen is arranged on an annular ion exchanger support plate. In this case, the screen preferably has a separable structure in order to facilitate the maintenance of exchanger support 53. It is particularly preferable that the annular screen be separated into fan-shaped members having the same shape. In the latter case, many openings are provided on an annular ion exchanger support plate, and many circular screens are arranged on the plate via the openings. In this case, it is particularly preferable that the annular ion exchanger support plate that is provided with the screens be separated into fan-shaped members having the same shape in order to facilitate the maintenance of exchanger support 53.

The air supply means described above may also be provided in the present embodiment. In the embodiment shown in FIG. 12, air supply nozzle 57 is provided on the sidewall of outer vessel 45. Air supply nozzle 57 supplies air to the space below ion exchanger support 53 when ion exchange resin is removed and backwashed. Ion exchanger support 53 has pipes 58 that are similar to pipes 27.

Flow regulating plate 54 that defines the top surface of demineralization chamber 44 is provided above ion exchanger support 53 between the sidewall of outer vessel 45 and the outer surface of inner wall 42. Flow regulating plate 54 is an annular structure that is similar to ion exchanger support 53, extending circumferentially and continuously between the sidewall of outer vessel 45 and inner wall 42 with the outer periphery extending along the sidewall of outer vessel 45 and with the inner periphery extending along inner wall 42. Flow regulating plate 54 is located slightly below partition plate 48. Thus, condensate that exits filter chamber 43 flows out from outlet ports of partition plate 48, then overflows into flow adjusting plate 54 located outside of partition plate 48. The condensate that flows into flow adjusting plate 54 is distributed and remains temporarily on the upper surface of flow adjusting plate 54 so that water level is made even. Flow adjusting plate 54a has a plurality of openings, and nearly the same amount of condensate, which temporarily remains on the upper surface of flow adjusting plate 54, drops from each opening to demineralization chamber 44.

Removal pipe 61 for removing ion exchange resin is provided in order remove ion exchange resin. Removal pipe 61 is open at the upper surface of ion exchanger support 53 and extends downwardly. Instead of removal pipe 61, removal pipe 61' may be provided. Removal pipe 61' is open at the sidewall of outer vessel 45 near the upper surface of ion exchanger support 53 (near the bottom part of ion exchange resin-loaded layer 46). In this case, flushing nozzle 56 that is open at the sidewall of outer vessel 45 is preferably provided above ion exchanger support 53. When ion exchange resin is removed, flushing nozzle 56 supplies water flow that is supplied horizontally from the sidewall of outer vessel 45 and that washes away ion exchange resin in the circumferential direction along the upper surface of ion exchanger support 53. Showering pipe 63 that is similar to the showering pipe in the first embodiment is provided in the upper part of the demineralization chamber.

Ion exchange resin loading pipe 55L for loading ion exchange resin is provided below flow adjusting plate 54 and above ion exchange resin-loaded layer 46 in order to load ion exchange resin. Ion exchange resin loading pipe 55 is open at the upper part of demineralization chamber 44. Resin surface leveling nozzle 59 may be provided in order to load ion exchange resin as evenly as possible. Resin surface leveling nozzle 59 is open at outer vessel 45 on the lateral side of demineralization chamber 44, as shown by the dashed line in FIG. 12, and supplies airflow substantially in the horizontal direction.

Air supply pipe 65 and air discharge pipe 60 are provided on the sidewall of outer vessel 45. Air supply pipe 65 is connected to the space below filter chamber 43 and air discharge pipe 60 is connected to the upper part of filter chamber 43. Air supply pipe 65 and air discharge pipe 60 generate an airflow in filter chamber 43 when filter elements 50 are backwashed.

Figure 13:
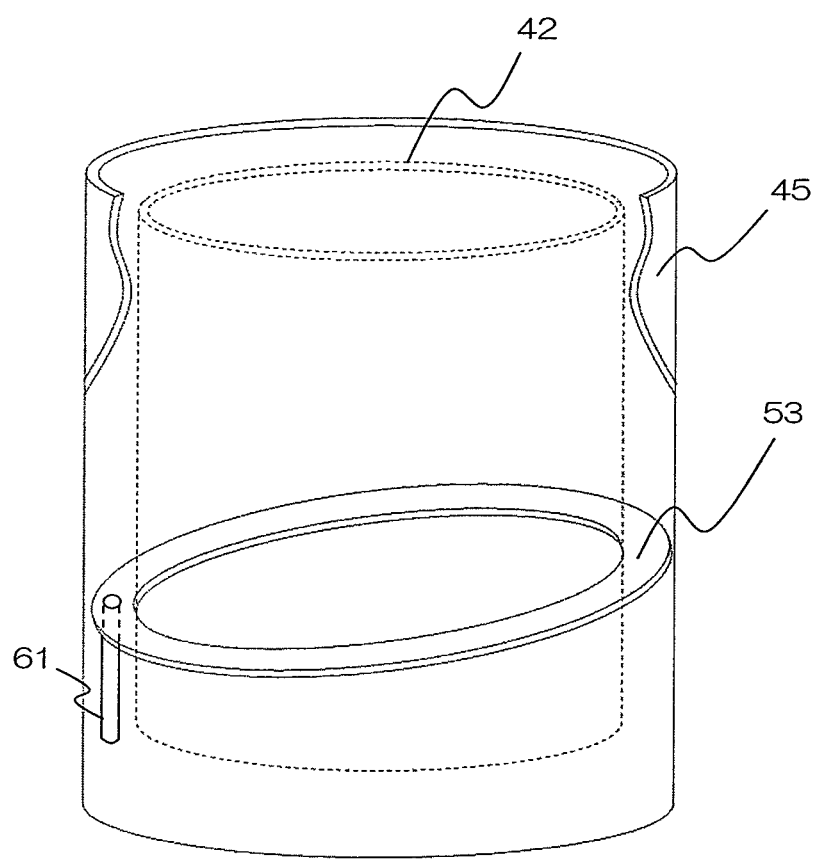
FIG. 13 is a schematic diagram showing a modification to the ion exchanger support of the demineralization tower shown in FIG. 12.

The upper surface of ion exchanger support 53 may be inclined downwardly toward ion exchange resin removal pipe 61, as shown in FIG. 13. Since the upper surface of ion exchanger support 53 is a smooth surface free of irregularities and since the effect of gravity is produced, ion exchange resin can be easily collected. The inclined ion exchanger support can also be applied to the first and second embodiments.

The present invention has been described using the examples of a demineralization tower of a condensate treatment system, but the present invention may also be applied to a regeneration tower, as described above. A regeneration tower has the same basic configuration as the demineralization tower shown in FIG. 2. The inside of a regeneration tower is loaded with used ion exchange resin that is collected from a demineralization tower. An acid or alkaline agent is injected instead of condensate so that the used ion exchange resin is regenerated based on the principle of ion exchange. The regeneration tower has the same ion exchanger support as the demineralization tower, and may have the same structure as the embodiments mentioned above.

In particular, anion exchange resin and cation exchange resin may be loaded together in a regeneration tower and they may be separated based on the difference of the specific gravities. In this case, an airflow may be supplied from below the ion exchanger support in order to carry out an operation that is similar to backwashing. According to the present invention, since the airflow can be uniformly supplied to the ion exchange resin, separation efficiency is improved.

In addition, the present invention may be applied not only to a condensate treatment system for a power generating facility, but also to every type of ion exchanging apparatus for water treatment.

Figure 14A:
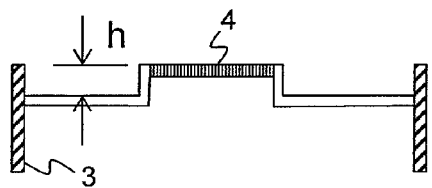
FIG. 14A is a sectional view of the ion exchanger support according to another embodiment of the present invention.
Figure 14B:
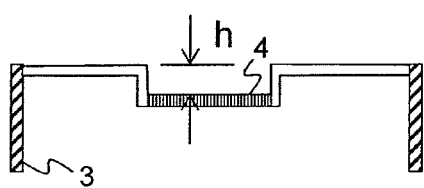
FIG. 14B is a sectional view of the ion exchanger support according to another embodiment of the present invention.
Figure 14C:
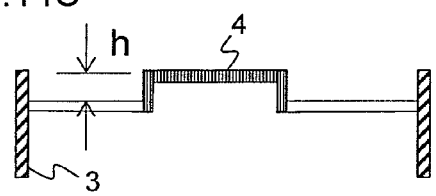
FIG. 14C is a sectional view of the ion exchanger support according to another embodiment of the present invention.
Figure 14D:
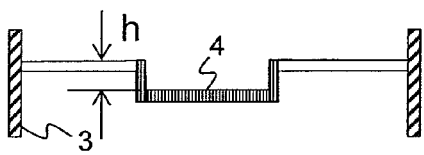
FIG. 14D is a sectional view of the ion exchanger support according to another embodiment of the present invention.
Figure 14E:
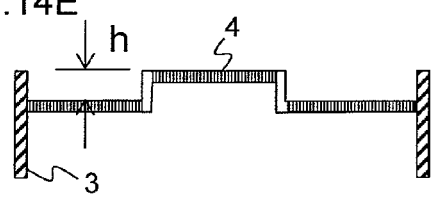
FIG. 14E is a sectional view of the ion exchanger support according to another embodiment of the present invention.
Figure 14F:
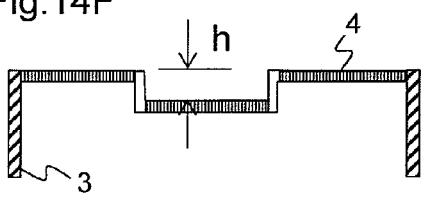
FIG. 14F is a sectional view of the ion exchanger support according to another embodiment of the present invention.
Figure 14G:
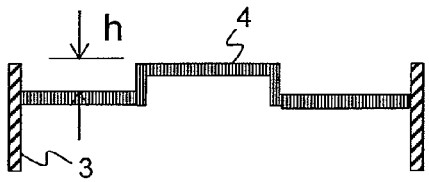
FIG. 14G is a sectional view of the ion exchanger support according to another embodiment of the present invention.
Figure 14H:
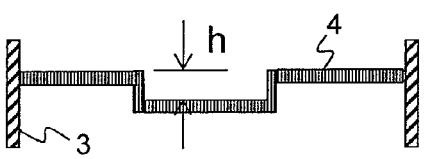
FIG. 14H is a sectional view of the ion exchanger support according to another embodiment of the present invention.

According to the present invention, the upper surface of the ion exchanger support is preferably a plane or a curved concave surface that protrudes downwardly. However, the upper surface of the ion exchanger support may be slightly uneven, as shown in FIGS. 14A to 14H. These figures show schematic sectional views of the ion exchanger support, in which the hatched portions are formed as screen 4. FIG. 14A shows that the central portion protrudes upwardly and the upper surface of the protrusion serves as the screen. FIG. 14B shows that the central portion protrudes downwardly and that the upper surface of the recess serves as the screen. FIG. 14C shows that the central portion protrudes upwardly and that the upper surface and the side surface of the protrusion serve as the screen. FIG. 14D shows that the central portion protrudes downwardly and that the upper surface and the side surface of the recess serve as the screen. FIG. 14E shows that the central portion protrudes upwardly and that the entire upper surface serves as the screen. FIG. 14F shows that the central portion protrudes downwardly and that the entire upper surface serves as the screen. FIG. 14G shows that the central portion protrudes upwardly and that the entire upper surface and the side surface serve as the screen. FIG. 14H shows that the central portion protrudes downwardly and that the entire upper surface and the side surface serve as the screen.

Figure 14I:
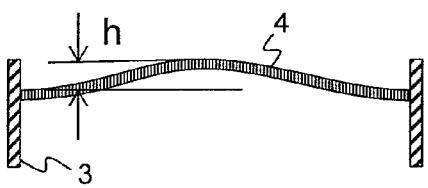
FIG. 14I is a sectional view of the ion exchanger support according to another embodiment of the present invention.
Figure 14J:
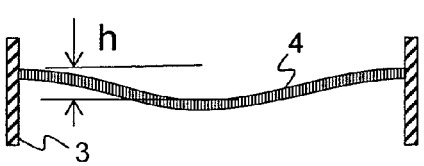
FIG. 14J is a sectional view of the ion exchanger support according to another embodiment of the present invention.
Figure 14K:
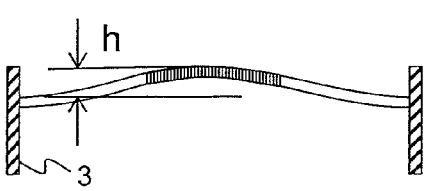
FIG. 14K is a sectional view of the ion exchanger support according to another embodiment of the present invention.
Figure 14L:
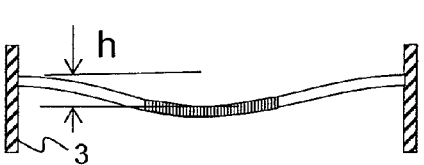
FIG. 14L is a sectional view of the ion exchanger support according to another embodiment of the present invention.

The upper surface of the ion exchanger support may be curved, as shown in FIGS. 14I to 14L. FIG. 14I shows that the central portion protrudes upwardly and the entire upper surface serves as the screen. FIG. 14J shows that the central portion protrudes downwardly and that the entire upper surface serves as the screen. FIG. 14K shows that the central portion protrudes upwardly and the upper surface of the central convex portion serves as the screen. FIG. 14L shows that the central portion protrudes downwardly and that the upper surface of the central concave portion serves as the screen.

Figure 14M:
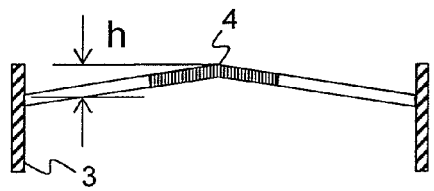
FIG. 14M is a sectional view of the ion exchanger support according to another embodiment of the present invention.
Figure 14N:
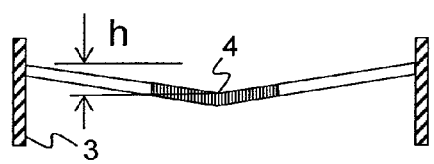
FIG. 14N is a sectional view of the ion exchanger support according to another embodiment of the present invention.

The upper surface of the ion exchanger support may have a circular cone shape or a circular truncated cone shape, as shown in FIGS. 14M to 14T. FIG. 14M shows that the central portion of the circular cone protrudes upwardly and that the upper surface of the central convex portion serves as the screen. FIG. 14N shows that the central portion of the circular cone protrudes downwardly and that the upper surface of the central concave portion serves as the screen.

Figure 14O:
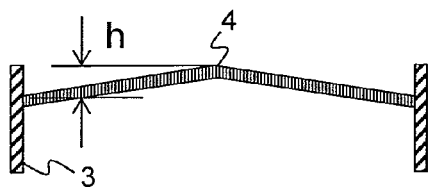
FIG. 14O is a sectional view of the ion exchanger support according to another embodiment of the present invention.
Figure 14P:
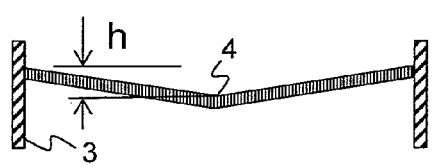
FIG. 14P is a sectional view of the ion exchanger support according to another embodiment of the present invention.
Figure 14Q:
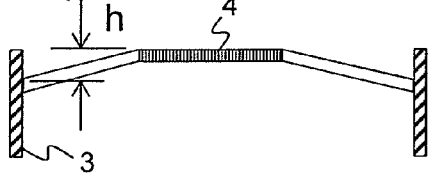
FIG. 14Q is a sectional view of the ion exchanger support according to another embodiment of the present invention.
Figure 14R:
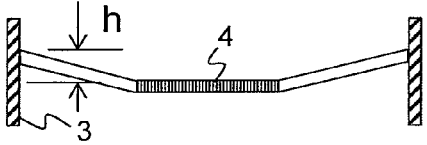
FIG. 14R is a sectional view of the ion exchanger support according to another embodiment of the present invention.
Figure 14S:
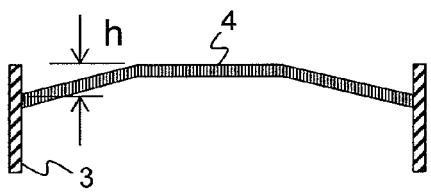
FIG. 14S is a sectional view of the ion exchanger support according to another embodiment of the present invention.
Figure 14T:
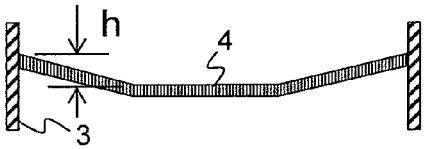
FIG. 14T is a sectional view of the ion exchanger support according to another embodiment of the present invention.

FIG. 14O shows that the central portion of the circular cone protrudes upwardly and that the entire upper surface serves as the screen. FIG. 14P shows that the central portion of the circular cone protrudes downwardly and that the entire upper surface serves as the screen. FIG. 14Q shows that the central portion of the circular truncated cone protrudes upwardly and that the upper surface of the central protrusion serves as the screen. FIG. 14R shows that the central portion of the circular truncated cone protrudes downwardly and that the upper surface of the central recess serves as the screen. FIG. 14S shows that the central portion of the circular truncated cone protrudes upwardly and that the entire upper surface serves as the screen. FIG. 14T shows that the central portion of the circular truncated cone protrudes downwardly and that the entire upper surface serves as the screen.

In FIGS. 14A to 14T, difference of elevation h is preferably as small as possible in order to increase the collecting efficiency of the ion exchanger support and to reduce the amount of ion exchanges that do not function. Specifically, difference of elevation h is preferably equal to or smaller than twice the thickness of the ion exchanger support.

DESCRIPTION OF REFERENCE NUMERALS

1 Demineralization tower
2 Inner space
3 Outer vessel
4, 34 Ion exchanger support
4a, 34a Upper surface of the ion exchanger support
5, 35 Screens
5a, 35a Upper surface of the screen
5b, 35b Wire member
5c, 35c Support rod
6 First screen support plate
7 Support member
21 Ion exchange resin-loaded layer
36 Second screen support plate
36a Upper surface of the second screen support plate
37 Pipe

What is claimed is:
1. An ion exchanging apparatus, comprising:
an outer vessel that has an inner space;
an ion exchanger support that separates at least a part of the inner space into an upper space and a lower space, wherein the ion exchanger support has a screen and a screen support plate that supports the screen, said screen support plate comprising a plurality of openings,
ion exchangers that are supported on the ion exchanger support and that are loaded in the upper space,
an air supply nozzle that is provided through the outer vessel and that is open at the lower space; and
a plurality of pipes, which extend from the ion exchanger support to the lower space and, which supply an upward airflow from the lower space to the screen through the openings of the screen support plate, wherein each of the pipes is connected to a respective one of said openings of the screen support plate and has an opening that is provided on a part of a side surface of each pipe above the air supply nozzle,
wherein the screen supports the ion exchangers on at least a part of an upper surface thereof and has a flow path that allows water treated by the ion exchangers to flow from the upper surface in a downward direction, and
wherein the screen support plate has a plurality of openings that allow the water that flows through the screen to flow into the lower space,
wherein the screen includes:
a plurality of wire members that are positioned apart from each other and that extend in one direction;
a plurality of support rods that are provided between the wire members and the screen support plate and that extend to cross the wire members, wherein the support rods support the wire members and create a plurality of spaces between the wire members and the screen support plate.

2. The ion exchanging apparatus according to claim 1, wherein the upper surface of the ion exchanger support is a curved concave surface that protrudes downwardly.

3. The ion exchanging apparatus according to claim 1, wherein the upper surface of the ion exchanger support has a difference of elevation that is equal to or less than twice a thickness of the ion exchanger support.

4. The ion exchanging apparatus according to claim 1, further comprising:
a removal port for the ion exchangers, the removal port being located on the upper surface of the ion exchanger support, and
wherein the upper surface of the ion exchanger support is inclined downwardly toward the removal port.

5. The ion exchanging apparatus according to claim 1, wherein the ion exchanger support includes the screen that forms an entire area of the upper surface of the ion exchanger support and the screen support plate that supports the screen.

6. The ion exchanging apparatus according to claim 5, wherein at least a part of the screen and at least a part of the screen support plate are integrally formed.

7. The ion exchanging apparatus according to claim 5, wherein the screen or the screen support plate or both the screen and the screen support plate are divided into multiple sections.

8. The ion exchanging apparatus according to claim 1, wherein the ion exchanger support includes a plurality of the screens and a screen support plate, wherein each of the screens forms a part of the upper surface of the ion exchanger support and wherein the screen support plate has a plurality of openings that support the respective screens.

9. The ion exchanging apparatus according to claim 1, wherein the plurality of the pipes are integrated with the ion exchanger support.

10. The ion exchanging apparatus according to claim 1, wherein the ion exchanger support is supported on an inner circumferential surface of the outer vessel and is also supported by at least one support member, wherein the support member is located in the inner space and is fixed to a bottom of the outer vessel at a lower end of the support member.

11. The ion exchanging apparatus according to claim 1, further comprising:
a showering pipe for spraying water on the upper surface of the screen.

12. The ion exchanging apparatus according to claim 1, wherein the inner space is separated by an inner wall into a radially inner section and a radially outer section, wherein the inner section has a filter chamber that accommodates filter elements and the outer section has a demineralization chamber that has the ion exchanger support.

13. An ion exchanging apparatus comprising:
an outer vessel that has an inner space;
an ion exchanger support that separates at least a part of the inner space into an upper space and a lower space, wherein the ion exchanger support has a screen and a screen support plate that supports the screen;
ion exchangers that are supported on the ion exchanger support and that are loaded in the upper space;
wherein the screen supports the ion exchangers on at least a part of an upper surface thereof and has a flow path that allows water treated by the ion exchangers to flow from the upper surface in a downward direction, and wherein the screen support plate has a plurality of openings that allow the water that flows through the screen to flow into the lower space,
wherein the screen includes:
a plurality of wire members that are positioned apart from each other and that extend in one direction; and
a plurality of support rods that are provided between the wire members and the screen support plate and that extend to cross the wire members, wherein the support rods support the wire members and create a plurality of spaces between the wire members and the screen support plate,
an air supply nozzle that supplies air to the lower space, and
a plurality of pipes, wherein:
each pipe is connected at one end thereof to a respective one of said openings of the screen support plate,
each pipe has an opening on a side surface thereof, and
each pipe extends downwards in the lower space,
wherein the air supply nozzle is located on a side surface of the outer vessel above each other end of the plurality of pipes, and the opening on the side surface of each pipe locates above the air supply nozzle.

* * * * *